United States Patent [19]

Durre et al.

[11] Patent Number: 4,746,340
[45] Date of Patent: May 24, 1988

[54] AIR CLEANER APPARATUS

[75] Inventors: Reynold F. Durre; Dennis A. Nordberg, both of Eden Prairie, Minn.

[73] Assignee: Donaldson Company, Inc., Minneapolis, Minn.

[21] Appl. No.: 924,061

[22] Filed: Oct. 28, 1986

[51] Int. Cl.[4] ............................................. B01D 45/12
[52] U.S. Cl. ...................................... 55/347; 55/348; 55/396; 55/399; 55/450
[58] Field of Search .................................. 55/346–348, 55/396, 399, 439, 447–450

[56] References Cited

U.S. PATENT DOCUMENTS

| | | | |
|---|---|---|---|
| 2,201,301 | 5/1940 | Richardson | 55/347 X |
| 2,761,526 | 9/1956 | Kemmetmüller | 55/348 X |
| 3,449,891 | 6/1969 | Shohet et al. | 55/347 X |
| 3,469,566 | 9/1969 | Wilkinson et al. | 55/347 X |
| 3,713,280 | 1/1973 | Keller et al. | 55/396 X |
| 3,884,658 | 5/1975 | Roach | 55/439 X |
| 3,915,679 | 10/1975 | Roach et al. | 55/347 |
| 4,025,320 | 5/1977 | Amoroso | 55/347 X |
| 4,162,906 | 7/1979 | Sullivan et al. | 55/346 |
| 4,279,624 | 7/1981 | Wilson | 55/347 X |
| 4,537,608 | 8/1985 | Kaslow | 55/347 X |

FOREIGN PATENT DOCUMENTS

| | | | |
|---|---|---|---|
| 2426499 | 1/1980 | France | 55/348 |
| 1146262 | 3/1969 | United Kingdom | 55/396 |

*Primary Examiner*—Robert Spitzer
*Attorney, Agent, or Firm*—Merchant, Gould, Smith, Edell, Welter & Schmidt

[57] ABSTRACT

An air cleaner including a plurality of regularly arranged vortex separators and a network of regularly arranged exhaust ducts is disclosed. The vortex separators include a restriction between vortex air and particulate laden scavengable air. The duct network includes a plurality of regularly arranged structural ducts extending between the spaced apart side plates which hold the vortex separators. The structural ducts are in fluid communication with the ducting network leading to a common output.

8 Claims, 3 Drawing Sheets

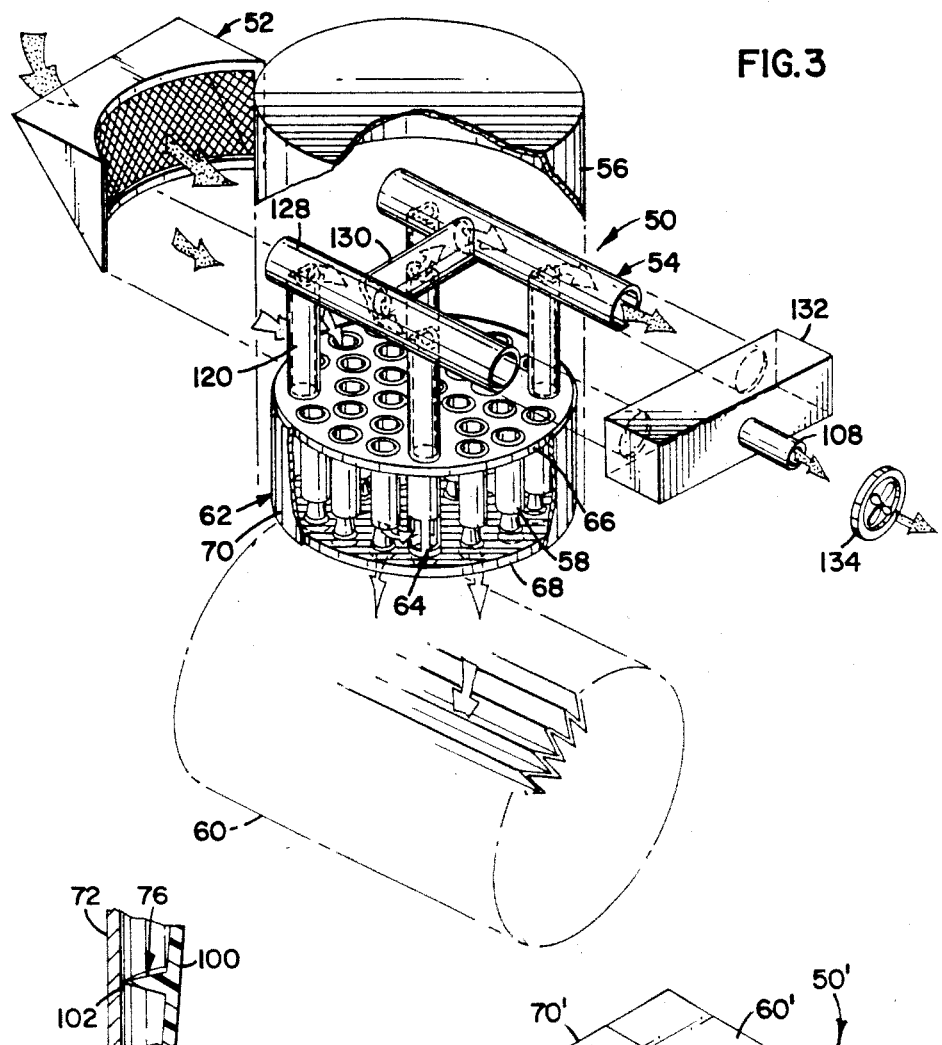
FIG.3
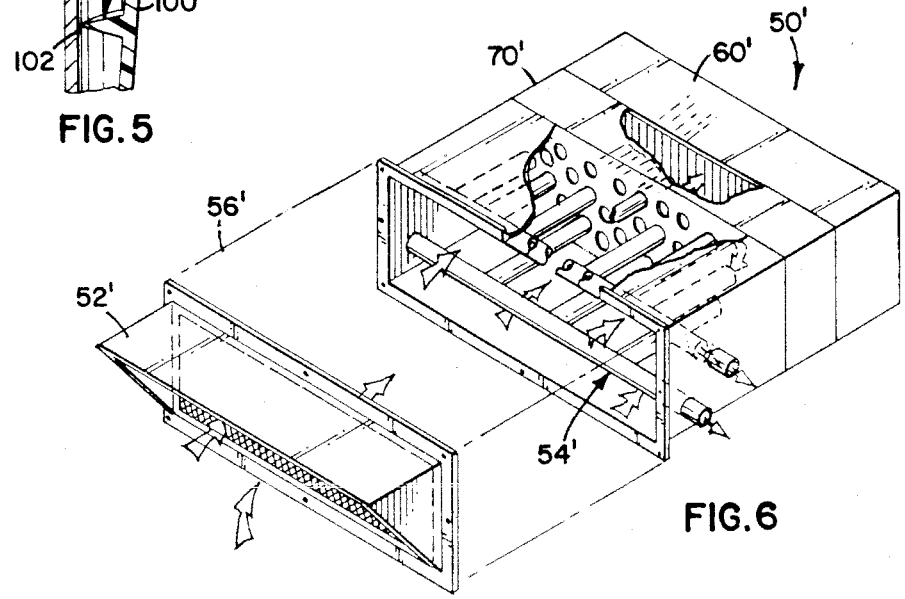
FIG.5
FIG.6

AIR CLEANER APPARATUS

FIELD OF THE INVENTION

The invention is directed to inertial type air cleaners which use vortex separators.

BACKGROUND OF THE INVENTION

Air cleaners using vortex separators are known. The present invention is an improvement over an air cleaner of the type which is illustrated in FIGS. 1 and 2. The prior art device 10 includes a plurality of regularly arranged vortex separators 12. The vortex separators 12 extend between plates 14 and 16. Plates 14 and 16 are part of an enclosure 18 which includes an outlet 20 for scavenged air 22.

With respect to a particular vortex separator 12, a cylindrical tube 30 is snapped at one end into an opening 32 in plate 14. An ever increasing outlet nozzle 34 is centered with radial braces 36 at the other end of tube 30. The free end of nozzle 34 is snapped into an opening 37 in plate 16. Spiral baffles 38 are attached to tube 30 near the end attached to plate 14.

As vortex separator 12 receives input air 24, baffles 38 cause it to rotate and centrifugally force particulates outwardly. Cleaner air stays near the vortex and flows out nozzle 34 as depicted by arrow 28. Particulate laden air flows between tube 30 and nozzle 34 and past brackets 36 into the enclosed region between plates 14 and 16. The particulate laden air 22 is then scavenged or drawn by an exhaust system. Vortex separator 12 is not restricted at brackets 36 and allows as much air and particulates depicted by arrows 40 to flow between tube 30 and nozzle 34 as may be drawn by the exhaust system, typically an ejector, fan or other energy source connected to output tube 20.

In the prior art device 10, the scavenged flow 22 is about 10% of the input flow 24. A problem with device 10 is that it is difficult to obtain a uniform 10% scavenge from each vortex separator 12. Device 10 includes passageways 26 which are essentially vacant rows and columns in order to provide air flow to outlet 20. The problem is that the vortex separators 12 nearest outlet 20 are overscavenged and the vortex separators 12 farthest from outlet 20 may not be scavenged at all. Furthermore, passageways 26 occupy space that could otherwise contain additional vortex separators. As a result, a lesser volume of air is processed by device 10 than would be the case if passageways 26 were filled with vortex separators. In addition, the combination of reduced throughput of air and a 10% scavenge rate results in a pressure differential across downstream plate 16 in the direction of forcing scavengeable particulate laden air toward cleaned air 28 if leakage at the connection between any vortex separator 10 and plate 16 occurs. Also, the 10% scavenge requirement requires considerable exhaust system energy to achieve. Thus, the prior art device although workable, has a number of deficiencies.

The present invention improves on many of the features of device 10 and, consequently, results in an air cleaner having greater air throughput and cleaning efficiency.

SUMMARY OF THE INVENTION

The present invention is directed to air cleaner apparatus which includes an enclosure having a pair of spaced-apart side plates with an array of regularly arranged vortex separators extending between the side plates. Each of the vortex separators includes an inlet for receiving an uncleaned mixture of air and particulates from external of the enclosure, a first outlet for directing cleaned air to external of the enclosure, and a second outlet for directing scavenge air and particulates to internal of the enclosure. Each of the vortex separators further includes a mechanism for maintaining a pressure differential across the second outlet. The pressure differential maintaining mechanism includes a mechanism for increasing velocity of scavenged air to aid in keeping the particulates in suspension in the scavenged air throughout the enclosure. The apparatus further includes a mechanism for exhausting the scavenged air and particulates from the enclosure to an outlet. The exhausting mechanism includes mechanism for radially receiving the scavenged air and axially directing the scavenged air from the enclosure toward the outlet.

In a preferred embodiment, the pressure differential maintaining mechanism would include a spiral ramp which has ends, or portions of the ramp, spaced to form a restrictive opening. In this way, a predetermined amount of air and particulates pass through and the ramp functions to hold relative pressures on each side thereof. Furthermore, the opening functions to increase the air velocity as it passes therethrough which aids in creating a turbulence within the enclosure. The turbulence helps to keep the particulates in suspension in the air thereby assuring more complete scavenging.

Another feature of the preferred embodiment includes a plurality of regularly arranged structural ducts. The ducts are in fluid communication with a duct system leading to a main exhaust outlet. The duct manifold may be either upstream or downstream from the enclosure. Each structural duct supports the side plates of the enclosure and has openings so as to receive scavenged air radially and direct it axially out of the enclosure to the duct manifold system. With such mechanism, the passageways of the prior art device 10 are unnecessary and a greater number of vortex separators may occupy the enclosure thus providing greater air throughput.

These advantages and objectives of the present invention are better understood by reference to the drawings, briefly described hereinafter, and to the detailed description of the preferred embodiment which follows thereafter.

BRIEF DESCRIPTION OF THE DRAWINGS

FIG. 3 is a perspective illustration, with portions broken away and other portions exploded away from one another, of apparatus in accordance with the present invention;

FIG. 5 is a cross-sectional view of a spiral ramp of a vortex eliminator in accordance with the present invention; and FIG. 6 is a perspective view of an alternate configuration of the present invention.

DETAILED DESCRIPTION OF THE PREFERRED EMBODIMENT

Figure 1:
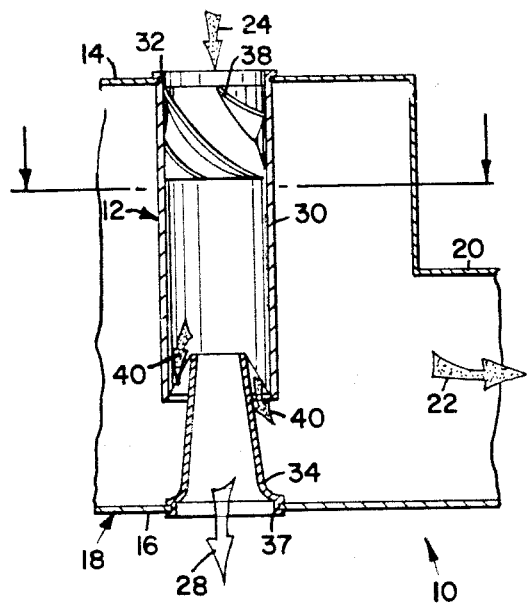
FIG. 1 is a side cross-sectional view of apparatus in accordance with a prior art air cleaner.

Referring now to the drawings wherein like reference numerals designate identical or corresponding parts throughout the several views, and more particularly to FIG. 3, an air cleaner apparatus in accordance with the present invention is designated generally by the numeral 50. Air cleaner 50 includes an input duct 52 and an exhaust duct manifold 54. Uncleaned air enters duct 52 and is directed into housing 56. The uncleaned air is forced through vortex separators 58 whereby cleaned air is commonly directed to a subsequent filter 60. Vortex separator 58 cause particulate laden air to be directed into enclosure 62 wherein it is drawn into structural tubes 64 and exhaust duct manifold 54.

Apparatus 50 is commonly used as a precleaner for a conventional engine filter on, for example, earth moving equipment or a large truck. In this type of application, uncleaned air is typically rammed into input duct 52 as a result of the forward movement of the vehicle. The low pressure or drawing effect at output 108 of exhaust duct manifold 54 is typically created by an aspirating muffler or ejector. It is understood, however, that input air may be provided in another way and that scavenging may be accomplished using a fan or other apparatus. In addition, air cleaned by vortex separators 58 may be directed for use as desired and need not necessarily be directed into a finer filter.

Input duct 52 and container 56 are merely mechanisms for directing uncleaned air from a source to the input ends of vortex separators 58. Vortex separators 58 are installed between a pair of spaced-apart side plates 66 and 68 of enclosure 62. Enclosure 62 further includes a wall 70 which extends between side plates 66 and 68 completely around the perimeters thereof. In the configuration of FIG. 3, wall 70 is cylindrical. In the configuration of FIG. 6, wall 70 is rectangular. (It is noted that primed numerals in FIG. 6 refer to equivalent items having the same numerals as described with respect to the other figures.)

Figure 4:
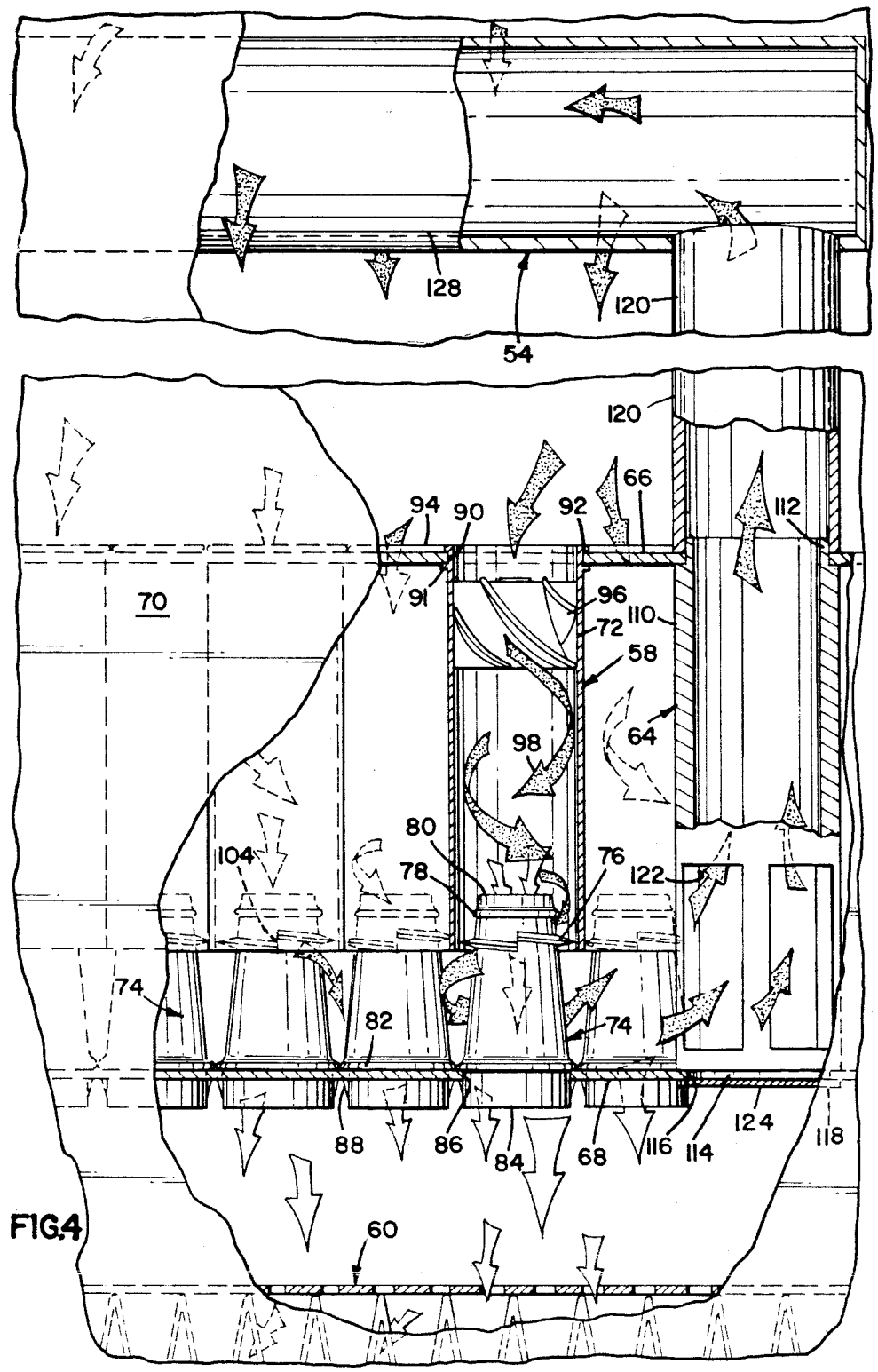
FIG. 4 is a side, cross-sectional view of a portion of the air cleaner enclosure including vortex separators in accordance with the apparatus of FIG. 3.

As shown in FIG. 4, vortex separator 58 includes a cylindrical tube 72 forming about two-thirds of the length of vortex separator 58. The other approximately one-third of the length of vortex separator 58 is formed by an everincreasing nozzle 74. A spiral ramp 76 extends between tube 72 and nozzle 74 to center nozzle 74 with respect to tube 72.

Nozzle 74 includes a reinforcing ring 78 at the input end 80. Ring 78 functions as a barrier to particulates back-flowing along the surface of nozzle 74 after encountering ramp 76. Ring 78 reduces the likelihood of reentrainment of particles in air flowing through in the vortex through input end 80 of nozzle 74. Nozzle 74 has a second ring 82 near the output end 84. Ring 82 butts against the inner surface of side plate 68. The portion of nozzle 74 which extends toward output end 84 from ring 82 is cylindrical so as to readily pass through an opening 86 in side wall 68, wherein the portion of nozzle 74 between rings 78 and 82 is ever-increasing and is shown to have a frustoconical shape in the figures. A plurality of barbs 88 are formed outwardly in the wall of the portion of nozzle 74 between structural ring 82 and output end 84. Barbs 88 are spaced from ring 82 so that side plate 68 just fits in the space between barbs 88 and ring 82. In this way, nozzle 74 may be inserted through opening 86 until side plate 68 is received between barbs 88 and ring 82 as indicated. Preferably, nozzle 74 is made of a plastic material which will deflect somewhat so that nozzle 74 may snap into place as described.

Tube 72 is cylindrical and includes a flange 91 near input end 94. Flange 91 contacts the interior side of side plate 66. Generally, enclosure 62 is not finally assembled until vortex separators 58 are installed. Thus, preferably the input end of tube 72 is inserted through opening 90 from what becomes the interior side of plate 66. Flange 92 is then curled down with a heated tool. Alternatively, tube 72 could be installed from the exterior side if barbs, like items 88, replaced flange 91. Tubes 72 and nozzles 74 are brought together when plates 66 and 68 are finally fastened to wall 70 to form enclosure 62.

Tube 72 includes a plurality of baffles 96 near input end 94. Baffles 96 extend a short distance inwardly from the wall of tube 72 and are angled with respect to the axis of tube 72 so as to direct incoming air spirally as illustrated by arrows 98. In this way, the particulates which are heavier than the molecules of the gases in air are centrifugally forced outwardly to near the wall of tube 72. The cleaner air near the vortex enters nozzle 74 and passes therethrough to the downstream side of side plate 68. The particulates and some air pass between ring 78 of nozzle 74 and the wall of tube 72 to ramp 76.

Ramp 76 has a much shorter pitch than the inclined or spiral pitch of baffles 96. Nevertheless, ramp 76 is inclined in the same direction as baffles 96 so as to continue to direct the air and particulates in the same spiral direction. Preferably, ramp 76 has a triangular crosssection as shown in FIG. 5 such that the base 100 of the triangular cross section is a part of or attached to nozzle 74 while the opposite apex 102 touches the wall of tube 72. The pitch of ramp 76 is chosen so as to obtain the desired opening 104 between consecutive levels of ramp 76. Preferably, opposite ends of ramp 76 do not extend past one another. In this way, the triangular cross-section and the creation of opening 104 at the location of the opposite ends of ramp 76 allow for simplified tooling when molding nozzle 74. In addition, opening 104 then has a trapezoidal shape; the longest side being at the wall of tube 72. This enhances the likelihood of larger particulates getting through opening 104 thereby reducing the likelihood of plugging opening 104. This is the case since opening 104 is largest near the wall of tube 72 where the largest particulates are likely to be because of the action of centrifugal force.

The size of opening 104 is chosen to allow a desired percentage of incoming air through (preferably less than 6%) or conversely to force a certain percentage of throughput or cleaned air to pass through nozzle 74. It has been found that by using ramp 76 and restricting the size of opening 104 to allow 5% of the incoming air and particulates through, that in combination with exhaust manifold 54 a cleaning efficiency (percentage of particulates scavenged out of input air relative to input air) equivalent to prior art apparatus 10 at a 10% scavenge rate is obtained.

Exhaust duct manifold 54 includes a plurality of structural ducts 64 leading to a network of ducts which interconnect and empty into outlet 108. Structural duct 64 is shown most clearly in FIG. 4. Duct 64 includes a tube 110 which has a central portion with a first outer diameter which extends between side plates 66 and 68. Tube 110 also includes opposite end portions 112 and 114 with second outer diameters. The second outer diameters are smaller than the first outer diameters so as to create a shoulder at the radial plane where the central portion and the opposite end portions meet. End portion 114 extends through an opening 116 in side plate 68 and is held in place by a retaining washer 118 which is fastened to the part of end portion 114 extending beyond side plate 68. Similarly, a part of end portion 112 extends beyond side plate 66 and is held in place by an axially aligned duct 120 which is a part of the duct manifold 54. Structural tube 64 also includes a plurality of openings 122 regularly spaced about the axis of tube 110 near side plate 68. As shown, openings 122 have a rectangular shape in the cylindrical wall. Air and particulates scavenged from enclosure 62 enter tube 64 in a radial direction and then are drawn axially through tube 64 into duct 120 of manifold 54. In this regard, a cover plate 124 closes the end of tube 110 near end portion 114.

Duct manifold 54 comprises tubes 120 which are attached to and axially aligned with structural ducts 64. Ducts 120 attach to and are in fluid communication with main ducts 128 which are generally perpendicular to tubes 120. Depending on how many ducts 120 there are and how they are arranged, there may be one or more main ducts 128. If there is more than one main duct 128, they may be interconnected with a connecting duct 130 as shown in FIG. 3. In any case, the scavenged air flowing through ducts 128 is ordinarily brought together in a common enclosure or duct 132 before exhausting through output 108. As indicated previously, air and particulates are scavenged through the duct system by a muffler, an ejector, a fan or some other air drawing device as illustrated at 134.

In use, apparatus 50 is installed to receive input air through duct 52 as ram air due to a moving vehicle or from a fan or some other device or is drawn into apparatus 50 by the use system for which apparatus 50 is supplying cleaned air. The scavenging exhaust of apparatus 50 is connected to a muffler, an ejector, a fan or other device capable of scavenging air and particulates.

Uncleaned input air is directed by duct 52 and container 56 to input ends 94 of vortex separators 58. On entering each vortex separator 58, the air is deflected by baffles 96 into a spiral pattern thereby centrifugally forcing particulates outwardly against the cylindrical wall of tube 72. The vortex of the swirling air passes through tube 72 and enters nozzle 74 to be directed to the downstream side of enclosure 62 and thereafter, as illustrated in FIGURE 3, into a use device. The particulates and air swirling near the wall of tube 72 miss input end 80 of nozzle 74 and impact spiral ramp 76. The air and particulates continue to spiral in the same direction along ramp 76 and finally pass through opening 104. Opening 104 serves as a restrictive nozzle so that the velocity of the air and particulates increases after passing therethrough. Such increased velocity is advantageous in that it creates a turbulence within enclosure 62 which keeps the particulates in suspension thereby minimizing the likelihood of particulate buildup in any portion of enclosure 62. In addition, spiral ramp 76 provides a separating barrier between input air in tube 72 and scavengable air and particulates in enclosure 62. As such, a pressure differential is established such that the pressure within tube 92 upstream of spiral ramp 76 is higher than the pressure in enclosure 62 downstream from spiral ramp 76. Also, by restricting scavenged air and particulates at ramp 76, the pressure in enclosure 62 is readily reduced below the cleaned air pressure downstream from side wall 68 so that any leakage through opening 86 is in the direction of clean air into enclosure 62, rather than scavengable air outward to the cleaned air downstream from side plate 68.

The structural tubes are regularly arranged throughout the regularly arranged vortex separators. In this regard, the vortex separators are preferably arranged to be equally spaced from one another and to completely fill enclosure 62 leaving only narrow spaces between one another. Structural tubes 64 are also preferably equally spaced from one another and simply take the location of a vortex separator at each location of a tube 64. In this way, scavenged air is drawn from vortex separators which surround it. No one tube 64 need draw scavenged air from a vortex separator which is closer to a different tube 64. This system is highly advantageous in that in combination with the spiral ramp 76 and the opening 104 associated therewith which results in keeping particulates in suspension, the scavengable air and particulates need not be drawn from the far reaches of enclosure 62, but only from vortex separators surrounding a particular tube 64. Furthermore, the tubes 64 only take up the space of individual, isolated vortex separators, and not the space of a number of separators along rows and columns as is the case in the prior art.

A further advantage and function of the regularly arranged, plurality of tubes 64 is that they give support and structure to side walls 66 and 68 so that large enclosures 62 may be created and yet a relatively constant spacing maintained between side walls 66 and 68. As a result, vortex separators 58 need not serve a structural function and may be made from a plastic material and may be made to simply snap into place between the side walls.

In any case, the scavenged air and particulates are drawn radially into openings 122 and directed axially along tubes 64 into axially aligned tubes 120 and then to main tubes 128 before combining in a common duct 132 and passing to outlet 108.

Figure 2:
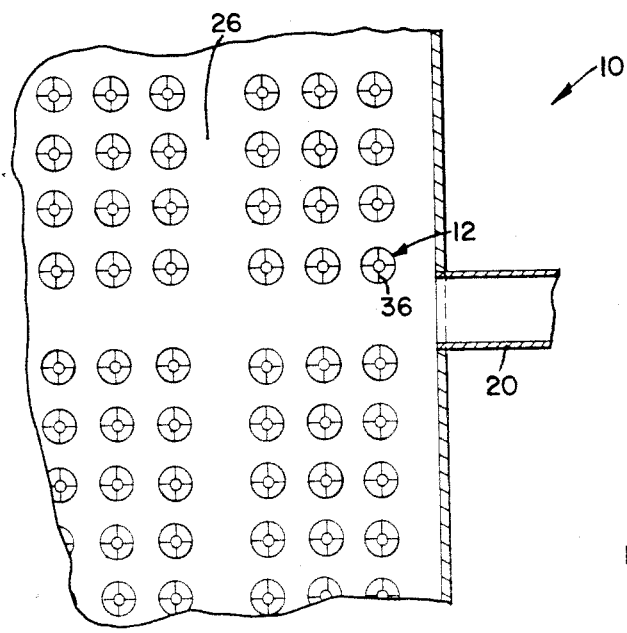
FIG. 2 is a cross-sectional view taken along line 2—2 of FIG. 1.

The prior art device 10 shown in FIGS. 1 and 2 is useful at a 10% scavenged rate, but results in an uneven scavenging so that greater than 10% scavenging is accomplished with vortex separators near output 20 than is accomplished for vortex separators at a distance from outlet 20. In addition, since a 10% scavenge is needed for reasonable operation, throughput from one side of enclosure 18 to the other is reduced. In distinction thereto, apparatus 50 results in at least as good an efficiency with respect to removing particulates by reducing the scavenged rate to 5% and realizes increased throughput. Furthermore, particulate removal is more uniform and complete.

Thus, a preferred embodiment has been described in detail. It is understood, however, that various geometries for enclosure 62 are equivalent (compare FIGS. 3 and 6). Therefore, in this regard, it is understood that changes made with respect to the embodiment disclosed, especially in matters of shape, size and arrangement to the full extent extended by the general meaning of the terms in which the appended claims are expressed, are within the principle of the invention.

What is claimed is:

1. Air cleaner apparatus, comprising:
   an enclosure including a pair of spaced-apart side plates;
   an array of regularly arranged vortex separators extending between said side plates, each of said vortex separators including an inlet for receiving an uncleaned mixture of air and particulates from external of said enclosure and a first outlet for directing cleaned air to external of said enclosure and a second outlet for directing scavenged air and particulates to internal of said enclosure, each of said vortex separators also including a first tube having a first end attached to one of said side plates and a second end spaced from the other of said side plates, each of said vortex separators further including means for maintaining a pressure differential across said second outlet, said pressure differential maintaining means including means for increasing velocity of scavenged air to aid in keeping the particulates in said scavenged air in suspension in said enclosure; and means for exhausting said scavenged air and particulates from said enclosure to an outlet means, said exhausting means including means for radially receiving said scavenged air and axially directing said scavenged air toward said outlet means, said exhausting means including means for holding said side plates spaced apart, said holding means including a second tube.

2. Apparatus in accordance with claim 1 wherein said holding means includes a tube having a central portion with a first diameter and opposite end portions with second diameters, said second diameter being smaller than said first diameter to form shoulders, each of said side plates including a receiving opening for one of said end portions of said tube, each of said side plates contacting a different one of said shoulders, said holding means further including means for fastening said end portions to said side plates whereby each of said side plates is held between one of said shoulders and said fastening means thereby holding said side plates.

3. Apparatus in accordance with claim 2 wherein said radially receiving and axially directing means includes a plurality of inlet openings equally spaced about the axis of said tube.

4. Air cleaner apparatus, comprising:
an enclosure including a pair of spaced-apart side plates;
an array of regularly arranged vortex separators extending between said side plates, each of said vortex separators including an inlet for receiving an uncleaned mixture of air and particulates from external of said enclosure and a first outlet for directing cleaned air to external of said enclosure and a second outlet for directing scavenged air and particulates to internal of said enclosure, each of said vortex separators including means for directing said uncleaned mixture along a spiral flow path, each of said vortex separators further including means for maintaining a pressure differential across said second outlet, said vortex separators including inner and outer endless walls, said pressure differential maintaining means including a spiral ramp extending between said inner and outer walls and having opposite ends forming a restrictive nozzle so that the velocity of the scavenged air is increased so as to aid in keeping the particulates in said scavenged air in suspension in said enclosure; and
means for exhausting said scavenged air and particulates from said enclosure to an outlet means, said exhausting means including means for radially receiving said scavenged air and axially directing said scavenged air toward said outlet means.

5. Apparatus in accordance with claim 4 wherein said ramp has a triangular cross-section, said nozzle having an opening of trapezoidal shape.

6. Air cleaner apparatus, comprising:
an enclosure including a pair of spaced-apart side plates;
a first array of regularly arranged structural ducts for holding said side plates apart;
a second array of regularly-arranged vortex separators extending between said side plates, each of said vortex separators including an inlet for an uncleaned mixture of air and particulates from external of said enclosure and a first outlet for cleaned air to external of said enclosure and a second outlet for scavenged air and particulates to space internal of said enclosure; and
means for exhausting said scavenged air and particulates from said space internal of said enclosure through said array of ducts to external of said enclosure, each of said ducts being in fluid communication with said space internal of said enclosure, said exhausting means including means for connecting said ducts for fluid communication with one another and with an outlet.

7. Apparatus in accordance with claim 6 wherein said duct connecting means includes a main exhaust duct running substantially perpendicular to said structural ducts, said main duct being upstream from said vortex separators.

8. Air cleaner apparatus, comprising:
an enclosure including a pair of spaced-apart side plates;
an array of regularly arranged vortex separators extending between said side plates, each of said vortex separators including an inlet for an uncleaned mixture of air and particulates from external of said enclosure and a first outlet for cleaned air to external of said enclosure and a second outlet for scavenged air and particulates to internal of said enclosure, said vortex separators including means for passing less than 6% of the incoming mixture through said second outlet as scavenged air and particulates, said vortex separators further including means for maintaining a first pressure level internal of said enclosure downstream from said second outlet less than a second pressure level external of said enclosure downstream from said first outlet; and
means for exhausting said scavenged air from said enclosure, said exhausting means including a plurality of regularly arranged structural ducts, said ducts having a central portion with a first diameter and opposite end portions with second diameters, said second diameter being smaller than said first diameter to form shoulders, each of said plates including a receiving opening for one of said end portions of one of said ducts, each of said side plates contacting a different one of said shoulders of each of said ducts, said exhausting means further including means for fastening said end portions to said side plates thereby holding said side plates spaced apart, each of said ducts having an axis and a plurality of openings equally spaced about said axis, said exhausting means still further including means for connecting said ducts for fluid communication with one another and with an outlet, said duct connecting means including a main exhaust duct running substantially perpendicular to the axis of said structural ducts.

* * * * *